Patented Aug. 5, 1952

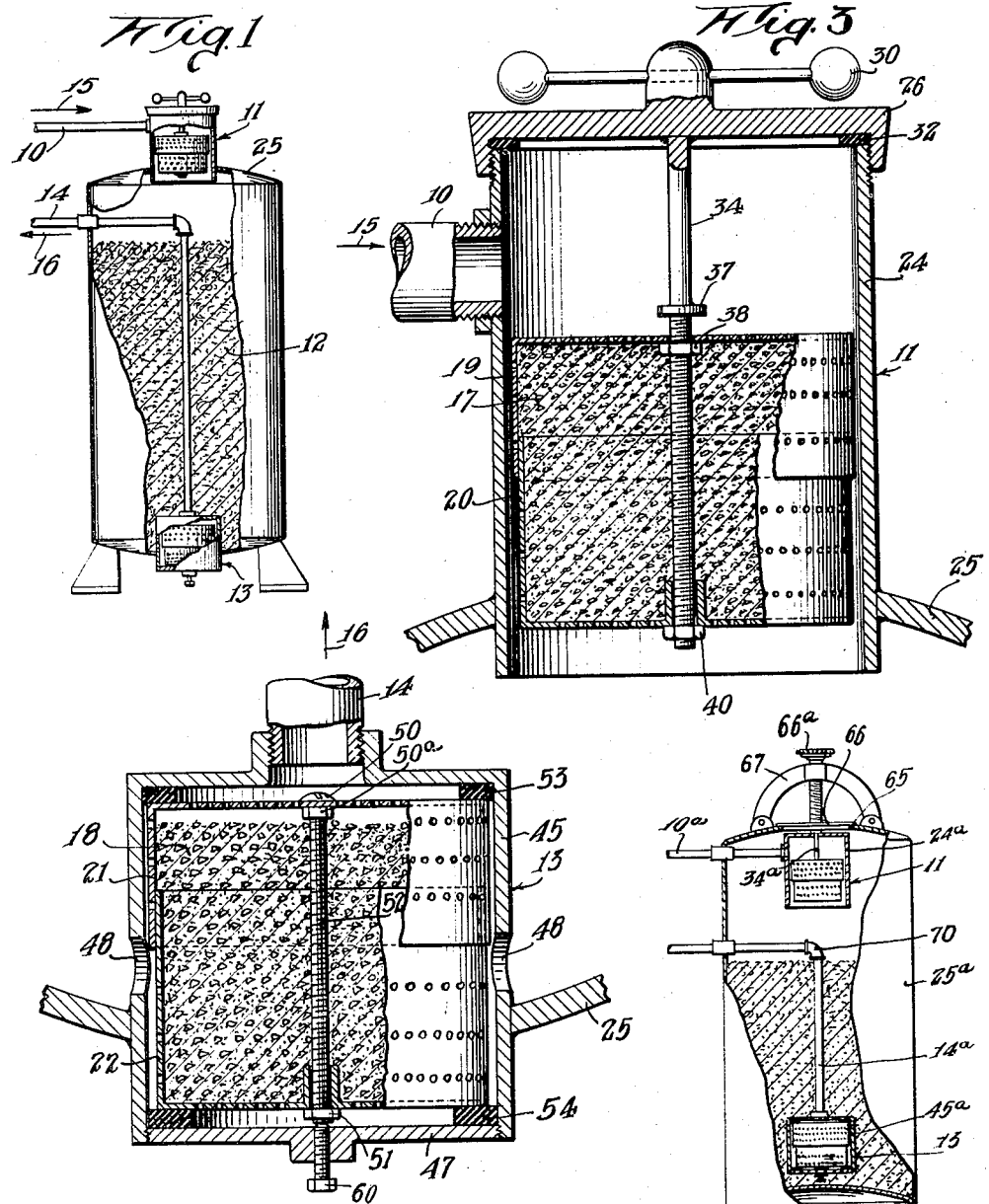

2,606,149

UNITED STATES PATENT OFFICE 2,606,149

FILTER STRAINER

Milton C. Robinson, Los Angeles, Calif.

Application February 4, 1947, Serial No. 726,398

9 Claims. (Cl. 210—24)

The present invention relates to apparatus useful in water softening and filtering equipment, or similar equipment, in which liquids are treated, and has as a primary object thereof the provision of a novel filter strainer in such equipment.

From the inception of the art of filtering liquids through granular filter media, or chemically treating liquids by the use of base exchange media, it has been customary practice to support this type of media upon a different type of media, such as beds of crushed rock, stone, pebble gravel, crushed glass or coal, or similar granular substance, the granular substances usually functioning singly or in graded beds, as a horizontal, loose, unconfined layer or layers of supporting the first mentioned type of media.

Inasmuch as such supporting beds and the supported media in use become fouled and intermixed with silt, mud, biological organisms or other substances, cleansing is necessary at periodical intervals. The cleansing process is normally accomplished, at least in part, by reversing the normal direction of liquid flow through the two media, the particular cleansing liquid being either the same liquid, which is treated, or in the case of water softening equipment, may be supplemented by a brine solution. When the supporting or supported media becomes non-homogeneous in nature as a result, for example, from irregular compaction of extraneous matter in local areas, non-uniformity of size of granular particles, excessive velocities of liquid flow, or some other mechanical, hydraulic or chemical cause, areas of greater and lesser resistance to liquid flow occur with the result that the supporting or supported bed becomes disarranged and "channelled" thereby to cause reduced efficiency of operation, imperfect cleansing and finally loss of valuable filtering or base exchange media.

Attempts have been made, in the history of the art, to confine the supporting and the supported media within its tank or receptacle by the use of screens, grids, orifices, slots, "egg crate" baffles, porous materials and other expedients. Such attempts, although successful to some degree and resulting in limited satisfactory operation, are not entirely satisfactory inasmuch as the granular particles confined by such devices are not permitted to move relative to one another to produce a self-cleaning, scouring, rubbing action therebetween, with the result that the cleaning of such granular particles is impaired.

Further, in the history of the art, attempts also have been made to substitute, wholly or in part, screens, meshes, grids, slots and porous materials to prevent the escape of filtering, base exchange or similar liquid treating media from the outlet of the confining tank or receptacle. Such attempts likewise have not proven too successful largely because of irremovable clogging or erosion of the grid and slot edges, filling of voids in porous substances by reason of the fact that extraneous material is held too firmly to be dislodged in the normal cleansing operation or is too easily passed into the outlet by reason of the widening of the strainer openings due to corrosion or erosion.

A further loss of filtering, base exchange or other liquid treating media, as encountered in present day practice is that the loss occasioned by failure to confine such media at the operating outlet of its tank or receptacle under conditions of excessive liquid flow, or at the "critical" rates of liquid flow which causes the bed of such media to "expand" beyond the limits of "freeboard," the freeboard being the unoccupied space in the tops of such tanks or receptacles provided for expansion of the contained media.

It is a further object of the present invention to provide an improved filter strainer in equipment of the type described wherein the filter, base exchange or other liquid treating media is confined within definite zones in the receptacle arranged in an approved manner so as to prevent the loss of such media to assure thorough cleansing action thereof in the cleansing operation.

Still another object of the present invention is to provide an improved water softening equipment in which the base exchange media and the filter media are definitely localized in a common receptacle in an improved manner such that the porosity of the filter media bed is automatically altered upon reversal of liquid flow therethrough.

Another object of the present invention is to provide an improved water treating equipment of the type specified in which the component confining elements thereof may be easily inserted into and removed from the common tank or receptacle.

A further object of the present invention is to provide improved liquid treating apparatus of the type specified in which one or more of the liquid treating or confining media therein is either packed or compressed depending upon the direction of liquid flow therethrough.

Still a further object of the present invention is to provide improved liquid treating equipment of the type specified in which at least one of the liquid treating media therein is definitely localized in such a manner as to allow it to be either packed or "expanded" depending upon the direction of liquid flow therethrough.

Yet another object of the present invention is to provide liquid treating equipment of the type specified in which the rate of liquid flow therethrough is limited in intensity in an improved manner whereby the loss of liquid treating media which otherwise may occur due to maloperation of exterior connections or valves or disarrangement of the supporting beds is prevented.

Still a further object of the present invention is to provide improved treating apparatus of the type specified in which the liquid treating capacity for any given sized tank or receptacle is increased by the use of at least one novel strainer which serves to eliminate waste space and "freeboard," thereby allowing such space, which would otherwise be devoid of liquid treating media, to be filled with same to increase the filtering base exchange or other chemical liquid treating action.

Although I have described my invention in association with water softening equipment, it is understood however by those skilled in the art that the present invention is not specifically limited to specific use in water softening equipment, but may find applicability in other liquid treating apparatus such as chlorinators, iron removers, demineralizers, deionizers, adsorbent filters and other similar equipment.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a view in side elevation of water or liquid softening or treating equipment incorporating the present invention, certain parts of the equipment being broken away to show the internal construction.

Figure 2 is a longitudinal cross sectional view of the lower retaining strainer in the equipment shown in Figure 1.

Figure 3 is a longitudinal cross sectional view of the upper retaining strainer in the equipment shown in Figure 1.

Figure 4 is a modified structure incorporating the present invention.

In the water or liquid softening or treating equipment shown in Figure 1 the normal flow of liquid to be treated is from the inlet pipe 10 through the upper strainer 11, through the base exchange material 12, through the lower retaining strainer 13 and then out the outlet pipe 14 as indicated by the arrows 15 and 16.

The upper and lower retaining strainers 11 and 13 respectively contain suitable granular material 17 and 18, such as crushed stone, pebble gravel, rock, coarse sand, crushed coal or glass, or other material of a granular insoluble nature, natural or processed. This granular material 17 and 18 is confined in a novel manner within mutually telescoping cups 19 and 20 and 21, 22, respectively, which may be formed from metal, plastic or other suitable material in such a manner that the confined granular material is packed and compressed to the correct density by movement of at least one of the cup members of a pair upon flow of the liquid in the direction wherein such packing is advantageous; and yet whereby upon an opposite movement of such cup occasioned by a reversed flow of the liquid, the granular material is released from compression and loosened to move and scour adjacent particles and thus thoroughly cleanse.

Referring specifically to the upper retaining strainer 11 shown in Figure 3, the telescoping perforated cups 19 and 20 are housed within the tubular open end member 24, which has one of its ends in liquid-tight communication with the tank 25. Its other end is closed by the screw-threaded closure member 26 so that liquid pressure may enter from pipe 10 screw threaded in the tubular member 24, pass through the filter strainer 11 and then enter the tank 25.

The closure member 26 may be of conventional type having a suitable hand wheel 30 mounted thereon for placing the ring shaped gasket material 32 under suitable compression force to thereby provide a connection of the closure member 26 with the tubular member 24.

The telescoping cups 19 and 20 are mounted for independent relative movement on the centrally disposed spacer bolt 34, whose upper end may be fastened to the closure member 26 and whose lower end passes centrally through the cylindrically shaped perforated cup 20. This centrally disposed spacer bolt 34 has mounted thereon intermediate its ends a pair of retaining collars or nuts 37 and 38, spaced from one another on opposite sides of the upper wall of the perforated cup member 19 in such a manner as to retain the cup member 19 on the bolt 34.

For certain types of liquid treating equipment nut 38 may be moved from the position shown, if desired, thereby allowing the cup member 19 to have greater or lesser independent relative movement.

Similarly, the lower end of bolt 34 has mounted thereon a retaining nut or collar 40 which serves to retain the cup shaped member 20 on the spacer bolt 34 but yet allows independent relative movement with respect thereto.

The upper retaining strainer 11 may be removed as a unit by turning the hand wheel 30 to unscrew the closure member 26 from the member 24 and then lifting the hand wheel 30 upwardly at the same time with the cup members 19 and 20 fastened as a unit thereto, or if not so fastened for certain types of liquid treating equipment, to permit removal separately and independently of hand wheel 30.

It is apparent that the retaining nuts 38 and 40 may be adjusted in position thereby to firmly lock the cup members 19 and 20 together so as to prevent relative movement of such cup members 19 and 20 with respect to the spacer bolt 34, or the nuts 38 and 40 may be adjusted in position to allow varying degrees of movement of the cup shaped members 19 and 20 with respect to the stationary supporting spacer bolt 34 when, for example, a liquid under pressure is forced down or up through the filter unit 11, as the case may be. Preferably the nuts 38 and 40 are so adjusted that the confined material 17 is packed or tends to become packed when the water or liquid to be softened or treated passes therethrough under pressure, and a reversal of liquid flow causes the cup shaped members 19 and 20 to move apart to thereby allow loosening of the granular material 17 and rubbing or scouring action against individual particles thereof by the liquid solution, such as a brine solution or water passing therethrough.

It is also apparent that the retaining nuts 38 and 40 may be adjusted so that the opposite effect may be produced; i. e., packing of the material 17 when the water or liquid to be softened or treated passes therethrough under pressure and an unpacking of the material 17 when the direction of liquid flow is reversed. This latter adjustment may be used to advantage when it is desired to limit the rate of liquid flow through the tank 25 containing the base exchange material 12 in such instances where, due to maloperation of valves or the like, the rate of flow of liquid otherwise may be too large.

The lower retaining strainer 13 is encased within the tubular housing member 45 which has its upper end in engagement with the pipe 14 screw threaded therein and has its lower end closed by the screw-threaded closure member 47.

The side wall of the housing 45 has openings 48 therein to provide a liquid path extending from the interior of the tank 25 through openings 48, through the lower retaining strainer 13 and through the pipe 14. The telescoping cup shaped members 21 and 22 may be mounted for independent relative movement within the housing 45 or may be fixed in position by adjustment of the nuts or collars 50, 50a and 51 on the centrally located bolt 52. Nuts 50 and 50a serve to maintain the cup member 21 in fixed position on the bolt 52.

Preferably the ring shaped spacer gaskets 53 and 54 are interposed respectively between the cup shaped member 21 and the housing 45 and between the cup shaped member 22 and the closure member 47 to maintain the retaining strainer 13 in spaced relationship; also to avoid possible shock when the direction of liquid flow is reversed.

It is apparent from the construction shown in Figure 2 that the lower retaining strainer 13 may be removed as a unit from its housing 45 by removing the closure member 47, and, also, in the event that it is found desirable to drain the tank or container, it is necessary only to remove the drain plug 60 which is screw threaded in a central aperture in the closure member 47.

The nuts on 50 and 51 may be adjusted in position in the same manner as outlined above in connection with the nuts or closures 38 and 40 shown in the upper retaining strainer 11 in Figure 3 to provide either (1) increased compacting of the material 18 when liquid to be treated flows therethrough, or (2) limiting of the rate of liquid flow through the equipment during the time liquid flows therethrough in the regenerating, cleaning stages, or (3) locking of the cup shaped members 21 and 22 so as to prevent relative movement therebetween and also with respect to the housing member 45.

It is further apparent that the adjustable nuts or collar members 50 and 51, also 38 and 40 in certain instances, may serve as stops to limit relative movement of the corresponding cup shaped members when the respective filter strainer units are adjusted to provide varying degrees of packing occasioned by liquid flow.

In the modification shown in Figure 4, the upper retaining strainer 11 and the lower retaining strainer 13 are both confined within the modified tank 25a, the modified tubular housing member 24a corresponding to the tubular housing 24 in the preferred embodiment is supported on the pipe 10a and the filter unit 11 is supported on the spacer bolt 34a, which has its upper end fastened to the upper face of the housing member 24a.

Also in the modification shown in Figure 4, the housing member 45a is screw-theadedly or otherwise supported on the pipe 14a, which in turn is supported on the tank 25 in the same way that the pipe 10a is supported on the tank 25a. The housing members 24a and 45a are tubular in cross section and may be of decreasing diameter to allow insertion and withdrawal through the top opening 65 of the tank 25a, which is normally closed in operation by a conventional closure member 66.

The closure member 66 is pressed against the tank 25a to form a liquid tight connection by the hand operated screw member 66a which screw-threadedly engages the arcuate shaped bracket member 67 having its ends adjusted to the upper surface of the tank 25a. The housing members 24a and 45a and retaining strainers 11 and 13 respectively thus may be withdrawn from the tank 25a as individual units after unscrewing the pipe 10a out of the housing member 24a and after unscrewing the upper pipe section 14a out of the pipe elbow section 70, in which case the individual units may be withdrawn through the opening 65.

The exchange, filtering or other treating media may be Zeolite, sand, carbon, or other granular or cellulose material used for the treatment of liquids in similar equipment.

The cup members 19, 20 and 21, 22 are preferably of noncorrosive, wear resistant material, such as stainless steel, although they may be of other metals and materials to achieve desirable results of the present invention. Also I prefer that at least one of the cup members 19, 20 and at least one of the cup members 21, 22 be movably mounted so as to move in response to reversal of liquid therethrough, and so that the material within the strainer closest to the effluent or discharge pipe is under pressure and the material within the other strainer closest to the inlet pipe is free to move in a larger confining volume.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In apparatus of the type described, a main tank, a bed of insoluble liquid treating material within said tank, a liquid inlet for said tank, a liquid outlet for said tank, a retaining strainer containing granular material between said liquid inlet and said liquid treating material for the passage of inlet liquid therethrough, and a retaining strainer containing granular material disposed between said liquid treating material in said main tank and said liquid outlet for the passage therethrough of outlet liquid, each one of said retaining strainers comprising an expansible chamber having relative movable parts whose volume is automatically changed upon relative movement of said parts produced in response to the direction of liquid flow therethrough to thereby produce packing or allowing expansion of said granular material depending upon the direction of liquid flow therethrough and preventing the escape of liquid treating material whereby the flow of liquid is impeded in one direction of flow therethrough and the liquid may freely flow therethrough in the other direction of flow with increased scouring and cleansing action produced by said granular material.

2. In apparatus of the type described, a main liquid treating tank, a bed of insoluble liquid treating material within said tank, a liquid inlet for said tank, a liquid outlet for said tank, a first housing in communication with said liquid inlet and said liquid treating material within said main tank, a second housing in communication with said liquid treating material in said main tank and said liquid outlet, a pair of perforated telescopic members arranged to contain granular material in each one of said first and second housings, each one of said pair of perforated telescopic members comprising an expansible chamber of two relative movable parts whose volume is automatically changed upon relative movement of said parts in response to the direction of liquid flow therethrough to thereby produce packing or allow expansion of said granular material therein, depending upon the direction of liquid flow therethrough whereby the flow of such liquid is impeded in one direction of flow therethrough and the liquid may freely flow therethrough in the other direction of flow with increased scouring and cleansing action produced by said treating material.

3. In apparatus of the type described, a main liquid treating tank with a bed of insoluble liquid treating material therein, a liquid conduit extending from said tank, a housing member in communication with said tank and said conduit, and a pair of perforated telescopic members arranged to contain granular material within said housing, said pair of perforated telescopic members having relative movable parts and comprising an expansible chamber whose volume is automatically changed upon relative movement of one of said parts with respect to the other of said parts in response to the direction of liquid flow therethrough to thereby produce packing or allow expansion of said granular material and confining said granular material to prevent intermingling with said liquid treating material, depending upon the direction of liquid flow therethrough whereby the flow of such liquid is impeded in one direction of flow therethrough and the liquid may freely flow therethrough in the other direction of flow.

4. In apparatus of the type described, a main liquid treating tank with a bed of insoluble liquid treating material therein, a liquid conduit extending to said tank, a receptacle having at least two parts mounted in the path of liquid flow from said conduit to said tank and means mounting said two parts for independent relative movement with respect to one another in response to the directional flow of liquid therethrough, said receptacle being arranged to contain granular material and comprising an expansible chamber whose volume is automatically changed, upon relative movement between said two parts, in response to the direction of liquid flow therethrough to thereby produce packing of said treating material or allow expansion of said treating material and confining said granular material to prevent intermingling with said liquid treating material, depending upon the direction of liquid flow therethrough whereby the flow of such liquid is impeded in one direction of flow therethrough and the liquid may freely flow therethrough in the other direction of flow.

5. In apparatus of the type described, a main liquid treating tank with a bed of insoluble liquid treating material therein, a fluid conduit, an open ended housing member disposed in the path of liquid flow from said conduit to said tank, a closure member for said open ended housing, and a pair of telescopic members movable one with respect to the other and arranged to contain granular material, said members being mounted on said closure member and extending into said housing, said pair of telescopic members comprising an expansible chamber whose volume is automatically changed upon relative movement of said telescopic members in response to the direction of liquid flow therethrough to thereby produce packing or allow expansion of said granular material and confining said granular material to prevent intermingling with said liquid treating material, depending upon the direction of liquid flow therethrough whereby the flow of such liquid is impeded in one direction of flow therethrough and the liquid may freely flow therethrough in the other direction of flow.

6. In apparatus of the type described, a main liquid treating tank with a bed of insoluble liquid treating material therein, a fluid outlet, an open ended housing in communication with said tank and said fluid outlet, a closure member for said housing, and a pair of telescopic members, one movable with respect to the other, arranged to contain granular material mounted within said housing, said pair of telescopic members comprising an expansible chamber whose volume is automatically changed upon relative movement of said telescopic members in response to the direction of liquid flow therethrough to thereby produce packing or allow expansion of said treating material and confining said granular material to prevent intermingling with said liquid treating material, depending upon the direction of liquid flow therethrough whereby the flow of such liquid is impeded in one direction of flow therethrough and the liquid may freely flow therethrough in the other direction of flow.

7. In water softening equipment, a main tank arranged to contain base exchange material, a fluid inlet for said tank, a fluid outlet for said tank, and at least one replaceable filter strainer arranged to contain granular material as a unit in the path of water flow, said filter strainer comprising an expansible chamber having two relatively movable parts, whose volume is automatically changed upon relative movement between said parts in response to the direction of liquid flow therethrough to thereby produce packing or allow expansion of said granular material and confining said granular material to prevent intermingling with said base exchange material, depending upon the direction of liquid flow therethrough whereby the flow of such liquid is impeded in one direction of flow therethrough and the liquid may freely flow therethrough in the other direction of flow with increased scouring and cleansing action produced by said granular material.

8. In water softening equipment, a main liquid treating tank with a bed of insoluble liquid treating material therein, an opening in the top of said tank, a filter strainer arranged as a unit to confine granular material, said filter strainer being arranged to be inserted into said tank through said opening in said main tank, said filter strainer comprising an expansible chamber having two relatively movable parts whose volume is automatically changed upon relative movement between said parts in response to the direction of liquid flow therethrough to thereby produce packing or allow expansion of said granular material and confining said granular material to prevent intermingling with said liquid treating material, depending upon the direction of liquid flow therethrough whereby the flow of such liquid is impeded in one direction of flow therethrough and the liquid may freely flow therethrough in the other direction of flow.

9. In apparatus of the character described, the subcombination comprising, a main housing having a fluid inlet and a fluid outlet and with a bed of insoluble liquid treating material therein, an expansible chamber within said housing in communication with the interior of said housing and contiguous with said bed, said expansible chamber having two relatively movable parts between which is disposed granular material, at least one of said parts being movable with respect to the other in response to liquid flow through said housing to thereby produce compacting or allowing expansion of said material between said relatively movable parts and confining said granular material to prevent intermingling with said liquid treating material.

MILTON C. ROBINSON.

REFERENCES CITED

The following references are of record in the file of this patent:

UNITED STATES PATENTS

| Number | Name | Date |
|---|---|---|
| 106,530 | Fleischmann | Aug. 16, 1870 |
| 184,024 | Stewart | Nov. 7, 1876 |
| 191,131 | Gainey | May 22, 1877 |
| 1,632,461 | Burhans | June 14, 1927 |
| 1,685,816 | Kenney | Oct. 2, 1928 |
| 1,703,451 | McGill | Feb. 26, 1929 |
| 1,749,622 | Yount | Mar. 4, 1930 |
| 1,839,350 | Slagel | Jan. 5, 1932 |
| 1,917,121 | Hughson | July 4, 1933 |
| 2,072,393 | Briggs | Mar. 2, 1937 |
| 2,072,848 | Brown | Mar. 9, 1937 |
| 2,081,968 | Wicks et al. | June 1, 1937 |
| 2,334,802 | Zuckerman | Nov. 23, 1943 |
| 2,364,617 | Bosler | Dec. 12, 1944 |
| 2,412,841 | Sprangler | Dec. 17, 1946 |

FOREIGN PATENTS

| Number | Country | Date |
|---|---|---|
| 17,739 | Great Britain | of 1905 |